United States Patent Office 3,367,827
Patented Feb. 6, 1968

3,367,827
ADHESIVE BONDING OF α-OLEFIN HYDROCARBON COPOLYMERS BY INTERMEDIATE COATING OF COPOLYMERS OF HALOGENATED UNSATURATED HYDROCARBONS AND ETHYLENE
George Arthur Gallagher, Media, Pa., assignor to E. I. du Pont de Nemours and Company, Wilmington, Del., a corporation of Delaware
No Drawing. Continuation-in-part of application Ser. No. 286,482, June 10, 1963. This application Apr. 13, 1966, Ser. No. 542,235
8 Claims. (Cl. 161—227)

This application is a continuation-in-part of my copending application Ser. No. 286,482, filed June 10, 1963, now abandoned.

This invention relates to the adhesive bonding of α-olefin hydrocarbon polymers to selected materials and, more particularly, to composite articles and a process for their preparation.

Sulfur-curable, chain saturated α-olefin hydrocarbon copolymers, (e.g., copolymers of ethylene, propylene, and a non-conjugated diene) are acquiring increasing importance today in the manufacture of a wide variety of useful products. To be used satisfactorily in applications such as tires, industrial belts, tarpaulins and the like, it is necessary that the copolymers be firmly bonded to materials such as nylon, polyethylene terephthalate, rayon, or cotton.

It has quite unexpectedly been found that good adhesion is obtained between the α-olefin hydrocarbon copolymers and the above materials by a method which employs two separate coatings on the material. This is even more surprising when it is considered that the use of the two coatings according to this invention yields composite articles exhibiting adhesive strengths often as high as ten times the adhesive strengths of articles prepared using either coating alone.

Briefly stated, this improvement is obtained by a process for adhering a sulfur-curable, chain-saturated α-olefin hydrocarbon copolymer to a polyamide, or a polyester, or cellulosic substrate which process comprises: (I) coating said substrate with a heat hardening phenol-aldehyde type resin, (II) drying the coating applied to step (I), (III) coating the resulting coated substrate with a sulfur-curable, chain-saturated, side-chain halogen-substituted hydrocarbon polymer having an inherent viscosity (measured on a solution containing 0.1 g. of polymer in 100 cc. of tetrachloroethylene at 30° C.) of at least about 0.3 and a halogen content of at least about 1% by weight, the halogen being selected from the group consisting of chlorine, bromine, and iodine, (IV) drying the coating applied in step (III); and (V) curing said α-olefin hydrocarbon copolymer while pressing the latter in contact with said coated substrate, thereby firmly adhering the latter to the α-olefin copolymer.

The substrates being bonded to the α-olefin hydrocarbon polymers include the normally solid polyamides, polyesters, and cellulosic substrates. In a particularly valuable application of the present invention, these materials are in the form of woven fabrics, tire cords, filaments, spun fibers or blends thereof. Representative examples are the industrial fibers such as nylon, polyethylene terephthalate, rayon, and cotton. In the case of polyester (especially polyethylene terephthalate) substrates, the teachings of this invention as briefly stated above can advantageously be applied in combination with the teachings of Krysiak, U.S. Patent 3,234,067; Shoaf, U.S. application Ser. No. 320,605, filed Oct. 29, 1963, now U.S. Patent 3,307,966; and Schwarz, U.S. application Ser. No. 509,436, filed Nov. 23, 1965.

The sulfur-curable chain-saturated α-olefin hydrocarbon copolymer is generally a copolymer of at least one α-mono-olefin having the structure $R—CH=CH_2$ wherein R is hydrogen or alky of 1 to 16 carbon atoms (e.g., ethylene, propylene, 1-hexene), with at least one non-conjugated hydrocarbon diene (e.g., 1,4-hexadiene). The most preferred class of copolymers include those containing about 20 to 75 weight percent ethylene monomer units. Representative copolymers include ethylene/propylene/1,4-hexadiene, ethylene/1,4-hexadiene; ethylene/propylene/dicyclopentadiene; and ethylene/propylene/5-methylene-2-norbornene. Other suitable monomers, copolymers and their preparation will be referred to hereinafter.

The heat-hardening phenol-aldehyde type resins are preferably those which thermally set within a temperature range of from about 65° to 225° C. without added catalysts. Suitable phenolic compounds useful in the preparation of these resins include mono- and polyhydroxy benzenes, particularly dihydroxy benzenes wherein the hydroxy groups are in the meta position with respect to each other; resorcinol is preferred. Among the suitable aldehydes, formaldehyde or materials furnishing formaldehyde such as paraformaldehyde are preferred.

The heat-reactive phenol-aldehyde type resins are prepared by procedures familiar to those skilled in the art. The water-soluble type can be made by reacting 0.5 to 2.0 mols of formaldehyde with a mol of a phenolic compound such as resorcinol under conditions which are neutral to basic. A strong basic catalyst, such as an alkali metal hydroxide, is customarily employed to provide the desired pH. The mixture of the resorcinol, formaldehyde, and alkali catalyst is usually allowed to react at about 25° C. but higher temperatures may be employed to hasten the reaction, if desired.

Generally a certain minimum time is required before the water-soluble phenol-aldehyde type resins have reached a sufficient degree of polymerization to be useful. Furthermore, there is a certain maximum time beyond which they are no longer useful as the first coat in this invention. These times are determined by the pH and the temperature at which the condensations are carried out. For example, a resin prepared at 25° C. and a pH of 7.4 is generally not used in less than 4 days nor more than 34 days from the date of mixing, whereas a resin prepared at 25° C. and at a higher pH (for example, a pH of 8.9) is generally not used in less than 2 hours nor more than 50 hours from the time the ingredients are mixed.

Various techniques and modifications may be used in the preparation of the phenol-aldehyde type resin without departing from the scope of this invention. For example, a resin may be prepared in a more stable form and then brought to the desired composition and pH by the later addition of more formaldehyde and alkali. (A suitable resin of this type is available from the Koppers Co., Inc., as "Penacolite" R–2170 solution.)

It has been observed that when fabrics are to be adhered, somewhat better results are obtained using phenolic resins made under nearly neutral conditions. However, when tire cords are coated, approximately the same results are obtained whether the resin is prepared under neutral or alkaline conditions. Representative resorcinol resins have been made by reacting 0.72 to 2 molar proportions of formaldehyde with one molar proportion of resorcinol such that the final pH ranges from about 7.4 to 10.0.

Although the phenol-aldehyde type resin alone gives excellent results as the first coat of this adhesive system, it may be sometimes desirable to use mixtures of the resin and a latex in place of resin alone. Wide variations may be tolerated in the amount of latex used. For example, useful mixtures of butadiene-styrene-2-vinylpyridine latex and resin have been made with latex to resin ratios (dry weight basis) ranging from 0.5:1 to 6:1. It is within the scope of one skilled in the art to choose the particular resin-latex recipe best used for a particular application. The choice between a phenol-aldehyde type resin and a resin-latex mixture will depend on the performance requirements of the particular application; for example, one reason to use a resin-latex blend would be to give the first coat more flexibility.

These phenol-aldehyde type resin-latex combinations may be prepared by first condensing formaldehyde and resorcinol to a low degree of polymerization. To the resulting resin one then adds the latex blend. The resulting composition is applied to the cord or fabric and dried. During this period the polymerization of the resorcinol/formaldehyde resin continues. The blend can be applied by any of the procedures suitable for applying the resin itself. The following recipes are typical.

Phenol-Aldehyde Type Resin:            Parts by Weight

| | |
|---|---|
| Water | 100 |
| Resorcinol | 10 |
| Formaldehyde (37% water solution) | 5.3 |
| Sodium hydroxide (10% water solution) | 5.5 |

Resin+Butadiene-styrene-
2-vinylpyridine Latex:            Parts by Weight

| | |
|---|---|
| Water | 200 |
| Resorcinol | 10 |
| Formaldehyde (37% water solution) | 5.3 |
| Sodium hydroxide (10% water solution) | 5.5 |
| Butadiene-styrene-2-vinylpyridine (41% water latex)[1] | 98 |

[1] A useful latex of the above type may be purchased from the General Tire and Rubber Co., as "Gen-Tac" latex.

As described above, the polymeric adhesive is a chain-saturated polymer having an inherent viscosity (measured as described above) of at least about 0.3 and having at least about 1 weight percent of side-chain substituted halogens selected from the group consisting of chlorine, bromine, or iodine, or combinations thereof; preferably, the halogen content is over 10 weight percent. The term "polymer backbone" is sometimes employed to describe the term "chain" employed here. Most often these polymers contain structural units derived by incorporation of monomers having a terminal carbon-carbon double bond (e.g., ethylene, 5,6-dibromo-1-hexene). Thus, these polymers are substituted polymethylenes, particularly upon substitution by halogenated alkyl radicals of from 2 to 4 carbon atoms containing from 1 to 2 halogen atoms. The halogenated adhesive polymer preferably has an iodine number of at least 2. This may be effected by copolymerizing a non-conjugated diene (such as those discussed hereinabove) with ethylene and a halogenated monomer. A preferred diene is 1,4-hexadiene. The most preferred adhesive copolymers are those having monomer units of ethylene/1,4-hexadiene/5,6-dibromo-1-hexene (e.g., having the units in a parts by weight ratio of 48:4:48; an iodine number of 12 and an inherent viscosity of at least 0.5) and ethylene/1,4-hexadiene/4,5-dibromo-1-hexene (containing 35 weight percent bromine and an iodine number of 10). Another preferred copolymer is one having units of ethylene/1,4-hexadiene/4,5-dichloro-1-hexene exhibiting an iodine number of about 10 and containing about 21 weight percent chlorine. The halogen-bearing polymeric adhesive can be prepared also by halogenating copolymers of α-monoolefins and non-conjugated dienes. Thus preferred adhesives are made by brominating an ethylene/1,4-hexadiene copolymer which has an inherent viscosity of about 1 and an iodine number of about 90 to give a product exhibiting an iodine number of 10 and containing 35 weight percent bromine; another preferred copolymer is prepared by chlorinating an ethylene/1,4-hexadiene copolymer to give a product having an iodine number of about 10 and containing about 21 weight percent chlorine. The copolymers being halogenated are preferably made from ethylene but it is to be understood that other α-monoolefins such as 1-hexene can frequently be employed, particularly with the aliphatic non-conjugated dienes. Further details on such polymers are obtainable from Nyce and Ro, U.S. Patent 3,222,330.

In the first step of the process of the present invention the substrate (e.g., the fabric) is coated with the heat-hardening phenol-aldehyde type resin. This coating may be applied in any manner desired, such as by dipping, painting, or by roller coating. The coating is then usually dried at an elevated temperature (such as 135° C.). The amount of phenolaldehyde type resin applied to the fabric is not critical; as little as about 1.6% (by weight of fabric) and as much as 33% have been used successfully. At very low concentrations of resin, however, it is desirable to use larger proportions of the adhesive copolymer. Thus, if about 1.6% of resin were applied, a representative weight of adhesive copolymer would be about 20%; in contrast, if about 10% resin were applied, about 5–10% of the adhesive copolymer would be sufficient. The adhesive properties do not change appreciably when the amount of the phenol-aldehyde type resin varies from about 3–9% and the amount of the adhesive copolymer is in the range of 6–16%; the amount of resin is preferably about 6% at this copolymer concentration. Excellent adhesive bonds may be obtained with very wide ranges of both resin and cement concentrations. As a further illustration of the lack of sensitivity of the strength of the adhesive bond to changes in the phenol-aldehyde type resin concentration, other conditions being constant, a value of about 54 lb./in. was obtained when the adhered article had 3% resin by weight of fabric and 58 lb./linear inch adhesion when 9% resin was present. For nylon tire cord at least 5 weight percent of the resin is desirable but as little as about 1.6% is adequate if the halogen polymer weight is about 20%.

For optimum results the second coat should be applied as soon as possible after the first coat. It was found that the cured composite articles made from freshly dipped nylon tire cords have much more adhesive strength than those made from dipped cords which have aged for five days. Thus, the H-pull adhesion at 100° C. of an ethylene/propylene/1,4-hexadiene elastomer stock to nylon was 22 lbs. if the cement was applied over freshly dipped cord but only 17 lbs. when it was not applied until the dipped cord had aged 5 days.

After the phenol-aldehyde type resin coating has been applied, it is necessary to remove any water present. The temperature is not a critical feature, although it should be sufficiently high to remove all of the water under the prevailing pressure. Thus, when an aqueous coating is applied and the fabric is treated at atmospheric pressure, it is usually desirable to dry the fabric in a heated zone maintained at a temperature of from about 100° to 225° C. The optimum time for this operation can easily be determined by one skilled in the art. If too little time is used the water is not completely removed and/or the condensation of the resin may not proceed to a sufficient degree. On the other hand, if the fabric or cord is exposed for an excess time at elevated temperatures, it is possible that the condensation of the resin can proceed to such a degree that the coated cord becomes excessively brittle. About 20 minutes at 135° C. or 1–2 minutes at 200° C. have been found to be suitable times. The optimum conditions for a given application can be easily established by simply determining the adhesion obtained.

After the resin coat has been dried, the second composition, viz., the halogen-containing adhesive polymer is introduced thereon and dried.

The halogen-containing adhesive polymer coating composition is made up of a homogeneous dispersion of the polymer in a volatile inert organic liquid. By the term "volatile" is meant boiling at standard pressure below about 160° C. One class of liquids for use are the chlorinated aliphatic hydrocarbons such as methylene chloride, chloroform, carbon tetrachloride, methylene bromide, and symmetrical tetrachloroethane. Another class includes aromatic hydrocarbons such as benzene, toluene, methylbenzene, ortho xylene, and isopropylbenzene (cumene). Still another class of useful solvents includes chlorinated aromatic hydrocarbons such as chlorobenzene.

The adhesive polymer composition is prepared by thoroughly dispersing the halogen-containing adhesive polymer and optional components such as curing aids and fillers. The order of addition is not critical; it is the usual practice to dissolve the halogen-containing polymer and thereafter to introduce the remaining components. A total solids concentration (including the polymer and all other solid additives) of about 7 to 20 grams/100 ml. of solvent has been used. Optimum performance requires that all of the components be homogeneously dispersed and this is accomplished by conventional agitation means. Ball milling is a representative procedure. The mixing can frequently be carried out at room temperature (20–30° C.), but higher temperatures can be employed when desired to reduce the viscosity and accelerate the mixing. In selecting the higher temperatures, those skilled in the art will, of course, take into consideration such factors as the boiling point of the inert solvent and the temperatures at which the curing agents present in the adhesive become active enough to produce measurable cure. Since the order of addition is immaterial, it is possible to dissolve the adhesive halogen-containing polymer in one solvent and disperse the remaining components in one or more other solvents and to combine all of the mixtures.

Those skilled in the art can vary the solids concentration of the adhesive composition as needed by empirical testing to achieve optimum results for a particular application. Representative compositions have solids contents ranging between about 10 to 20% by weight. The novel compositions can be stored at room temperature for long periods of time, such as 6 months.

The adhesive halogen-containing polymer composition is applied in a manner familiar to those skilled in the art. Thus, it can be deposited on the resin coated substrate using such conventional means as brushes, rollers, or swabs or the coated material can be dipped in the solution of the adhesive. The thickness of the coating applied will be somewhat a function of the solids concentration of the adhesive solution; it is generally preferred to apply a coating sufficient to leave a dry layer about 0.5 mil thick. After the coating has been applied, it is necessary to dry it. If so desired, the halogen-containing polymer adhesive composition may be applied to the surface of the α-olefin copolymer or to both the latter surface and the resin coated polyester, polyamide, or cellulosic substrate. In both instances a well-adhered assembly is obtained after cure under pressure. Generally, it is more convenient to apply both coatings to the polyamide, polyester, or cellulosic substrate.

Generally, the preferred amount of the halogen-containing adhesive polymer ranges from about 6 to 12% by weight of the coated polyester, polyamide or cellulosic substrate when the latter is in the form of a fabric or cord. As mentioned above, it is generally sufficient to leave a coating 0.5 mil thick after drying. Those skilled in the art can determine by routine experimentation the optimum amount to apply to the substrate when it is in the form of sheets or molded parts and the like. It is frequently undesirable to use both a thick coating of the resin and a thick coating of the halogen-containing adhesive polymer; if the adhesive phase intervening between the substrate and the α-olefin hydrocarbon copolymer becomes too thick for attainment of the best adhesive values obtainable from this system. In representative experiments with tire cords, about 0.9 to 19% of the halogen-containing adhesive polymer has been applied by weight of the dip coated cord containing the resin. Dipped nylon tire cord has been passed through a halogen-containing adhesive polymer composition (containing from 7 to 20 grams of solids/100 ml. of solvent) at rates ranging from about 2 to 5 ft./min., the amount of coating picked up by each pass through the composition ranging from about 1 to 20% by weight of the resin coated cord. Frequently about one to four passes through the coating bath have sufficed.

After the coating has been applied, the solvent is removed; it can be air-dried at room temperature or it can be very rapidly dried at elevated temperatures. It has been observed that the drying time at elevated temperatures can be varied quite widely without adversely affecting adhesive properties; in a representative series, no change in adhesion was noted among samples dried from 2–60 minutes at 135° C. It is, of course, conceivable that excessive exposure at elevated temperatures or use of unnecessarily high temperatures will produce undesirable effects on the adhesive quality of the cord due to undesirable reactions of the resin or cement and/or undesirable reactions of the curing ingredients.

The second coating may consist entirely of the halogen-containing adhesive polymer; however, better results are generally obtained if the adhesive polymer is compounded with a curing system similar to that being used for the α-olefin hydrocarbon copolymer. The adhesive polymer composition, optionally, may contain still other materials such as carbon black, inorganic fillers such as talc, whiting, and clay.

Those skilled in the art can determine by routine experiments the proper concentration needed to get the best results for a particular polymer-solvent combination for a specific application. The proportion of carbon black present may vary widely; preferably 40 to 60 parts are used for each 100 parts of halogen-containing adhesive polymer. Any of the conventional carbon blacks can be used such as furnace blacks, which are preferred, channel blacks, and thermal blacks. Mixtures of blacks can be employed when desired.

Typical curing aids used in the adhesive composition are sulfur, zinc oxide, and accelerators. About 0.2 to 3, preferably 0.75 to 2 parts of sulfur are present for every 100 parts by weight of the halogen-substituted adhesive polymer. Compositions containing concentrations below 0.2 part per 100 provide less satisfactory adhesion; concentrations above 2 parts are usually unnecessary. About 5 parts per 100 of zinc oxide are preferred although it is to be understood that higher or lower concentrations can be employed. The concentration of the metal oxide is important since it, in conjunction with sulfur and accelerator, controls the ultimate state of cure. At concentrations of 3 to 10 parts by weight per 100 parts by weight of halogen-substituted adhesive polymer, the rate and state of cure are very satisfactory. Concentrations above 10 parts per 100 are generally unnecessary. Concentrations below 2 parts per 100 are sometimes less satisfactory for developing and maintaining adequate vulcanizate properties. The best accelerators for the vulcanization are also the ones used for curing natural rubber. The most active accelerators include 2-mercaptobenzothiazole, thiuram sulfides, dithiocarbamates, and very similar derivatives. Representative accelerators include: tetramethyl thiuram monosulfide; tetramethyl thiuram disulfide; tellurium diethyldithiocarbamate; the zinc salt of dimethyldithiocarbamic acid and 2-mercaptobenzothiazole. A representative and preferred accelerator system includes tellurium diethyldithiocarbamate (1.5 parts) and tetramethylthiuram disulfide (0.75 part). Those skilled in the art can select by routine experiments the best combinations of accelerators when curing a particular assembly. In addition to the above-described components, the novel composition may include such optional components as conventional antioxidants.

The preferred sulfur curing system contains tellurium diethyldithiocarbamate (1.5 parts), tetramethylthiuram disulfide (0.75 part) and sulfur (1 part). Nearly as good results are obtained by the presentative system tetramethylthiuram monosulfide (1.5 parts), 2-mercaptobenzothiazole (0.5 part), and sulfur (2 parts). It is to be understood that various modifications of the sulfur curing procedures may be employed depending upon the stock. Various procedures and modifications of sulfur curing are more particularly described in Encyclopedia of Chemical Technology, Kirk and Othmer, published by Interscience Encyclopedia, Inc., New York, 1953, vol. 11, pp. 892–927; Principles of High-Polymer Theory and Practice, Schmidt and Marlies, published by McGraw-Hill Book Co., New York, 1948, pp. 556–566; Chemistry and Technology of Rubber, edited by M. Morton, Reinhold Publishing Corp., New York, 1959, pp. 93–129; The Applied Science of Rubber, edited by W. J. S. Naunton, Edward Arnold Ltd., London, 1961, pp. 346–413, 992–1099.

The α-olefin hydrocarbon copolymer is compounded with suitable sulfur curing agents before being bonded to the coated polyester, polyamide, or cellulosic substate. The sulfur curing system described above is suitable.

The adhered composite article is finally obtained by heating the curable assembly. Cure temperatures generally range between about 130–160° C. with about 150 and 160 being preferred. Cure times are not critical and can range from between about 10 minutes and 2 hours without adverse effect on the adhesion obtained. The cure time will vary inversely with the temperature, higher temperatures requiring shorter cure times. Those skilled in the art will select the particular conditions needed for optimum results based on such considerations as the conditions recommended in the art for the particular curing agents being used, etc. During the cure, sufficient pressure is applied to prevent blowing and to keep the elements of the assembly being adhered in good contact.

It has further been found that polyester substrates, particularly polyethylene terephthalate tire cords, can be pretreated before employing the teachings of my invention. Krysiak, U.S. Patent 3,234,067 discloses pretreatment with a mixture of (a) polyepoxide, (b) an aromatic urethane, (c) resorcinol-formaldehyde resin and (d) a vinylpyridine copolymer latex (commercially available as "Gen-Tac" latex dip as described in Example 25 hereof). Shoaf, U.S. application Ser. No. 320,605, filed Oct. 29, 1963, discloses pretreatment with a mixture of (a) polyepoxide and (b) an aromatic polyisocyanate or adduct thereof (see Example 28 hereof). Schwarz, U.S. application Ser. No. 509,436, filed Nov. 23, 1965, discloses pretreatment with a mixture of (a) 2-pyrrolidone, (b) polyepoxide, (c) alkaline catalyst, (d) optionally, a blocked isocyanate or formaldehyde, (e) an RFL latex overcoat (see Example 29 hereof). Since the pretreatments of Krysiak and Schwarz each constitute a first coating with a resorcinol-formaldehyde resin, the process of my invention can be conducted by merely applying thereover the coating of halogenated hydrocarbon polymer. To conduct the process of my invention on substrates pretreated according to Shoaf, it is necessary to apply the two coatings or my invention over the pretreated substrate.

The invention will now be described in and by the following examples of preferred embodiments thereof wherein parts and percentages are by weight unless otherwise specified.

EXAMPLE 1

A. *Preparation of phenol-aldehyde type resin*

A phenol-aldehyde type resin is prepared by stirring together 55.6 cc. of distilled water and 4.41 cc. of 7.85 weight percent aqueous NaOH solution in a 125-cc. Erlenmeyer flask at 25–30° C.; 2.76 g. of resorcinol are then added and mixed until dissolved. Then 3.80 cc. of 37% aqueous formaldehyde solution are added slowly with stirring. After being agitated for two minutes, the resin solution is aged for 44 hours at 25–30° C. before use. This resin solution contains about 6.4% solids, has a pH of 8.0 at 25° C. and a formaldehyde to resorcinol mole ratio of about 2.0 to 1.

B. *Preparation of adhesive copolymer*

An adhesive, halogen-substituted copolymer of ethylene/5,6-dibromo-1-hexene/1,4-hexadiene is prepared in a thoroughly dried 1-liter resin kettle fitted with an agitator, gas inlet tube, thermometer and exit tube. In it are placed 845 cc. of methylene chloride which has been dried over silica gel overnight with a slow nitrogen sparge. Agitation is begun and after the methylene chloride has been cooled to −5 to −10° C., 135 cc. (218 g./0.09 gram-mole) of 5,6-dibromo-1-hexene and 11.7 cc. (8.2 g. 0.10 gram-mol) of 1,4-hexadiene are added. The latter is purified by passing it through a neutral aluminum oxide column immediately before use. A mixed stream of ethylene and nitrogen is then introduced supplying the gasses at the respective rates of 0.40 liter per minute and 1.2 liters per minutes. After 20 minutes, 1.35 g. of freshly recrystallized vanadium oxy bis (acetylacetonate) and 8.7 cc. of diisobutylaluminum chloride are added to start the polymerization.

The gas addition is continued 2½ hours and during this time a noticeable increase in viscosity of the solution occurs. The temperature is kept at about −10° C.

After 2½ hours, the gas flow is stopped and 10 cc. of anhydrous ethyl alcohol are added to the polymerization mixture to deactivate the catalyst. The mixture is then poured into 1 liter of acetone, thereby precipitating the copolymer. After the acetone has been removed by filtration, the copolymer product is washed twice with approximately 500 cc. of anhydrous ethyl alcohol and then washed once more with approximately 500 cc. of acetone. The acetone is then removed and the copolymer allowed to dry overnight. About 85 grams of the ethylene/5,6-dibromo-1-hexene/1,4-hexadiene copolymer is obtained. It displays the following properties: percent Br, 34; iodine number, 11; inherent viscosity, 0.57 (0.1 gram copolymer in 100 ml. tetrachloroethylene at 30° C.).

C. *α-Olefin hydrocarbon elastomer*

The ethylene/propylene/1,4-hexadiene copolymer employed is made in accordance with the general directions of U.S. Patent 2,933,480 using a diisobutyl aluminum chloride/vanadium oxytrichloride catalyst and tetrachloroethylene solvent. Representative samples of this copolymer contain about 42–47% propylene monomer units and 3–4% 1,4-hexadiene monomer units by weight and exhibit Mooney (ML–4/100° C.) viscosity values of from about 80 to 90.

The elastomeric copolymer is compounded as follows:

| | Parts by weight |
|---|---|
| Ethylene/propylene/1,4-hexadiene copolymer | 100 |
| Carbon black, HAF | 50 |
| ZnO | 5 |
| Sulfur | 1 |
| 2-mercaptobenzothiazole | 0.5 |
| Tetramethyl thiuram monosulfide | 1.5 |

Stocks to be used for strip adhesion tests are sheeted off the mill to give about an 80-mil thickness. Stocks to be used for "H-Pull" tests are sheeted off so as to give a thickness of 125 mils. In the following examples, the elastomer stock is supported on the back by a 3 x 6" piece of a textile material such as canvas duck or a spun nylon fabric. To give additional strength an adhesive could also be placed on this support. In addition, a 3" x 1½" piece of cellophane is placed between the fabric and the stock at one end of the adhesion pad to facilitate separation of the fabric and the supported fabric for testing.

The adhesion of the resin coated fabric to the elastomer stock after vulcanization is measured by cutting a 1" x 6" wide strip from the center of the pad and then measuring the force necessary to separate the fabric from the stock at 25° C. An Instron tester is a convenient instrument for doing this.

D. *Adhesion of elastomer to substrate material*

A 3 x 6" piece of filament nylon fabric is immersed in resorcinol-formaldehyde resin prepared in A above at 25-30° C. for 5 seconds. The nylon fabric substrate used is a plain weave with a count of 60 x 40 obtainable as Style SN-7 from Wellington Sears, 111 W. 40th St., New York 18, N.Y. It is first scoured using a standard synthetic detergent to remove all finishing agents, etc. After the excess resin solution has been squeezed off, the dipped fabric is dried for 20 minutes at 135° C. and it is found that it gains 3-5 percent of the dried resin (gain in weight based on the weight of the untreated fabric).

The piece of resin-coated nylon is given a second coat of a copolymer adhesive cement made from the ethylene/5,6-dibromohexene/1,4-hexadiene terpolymer prepared as in B above having a bromine content of about 39%, an iodine No. of about 9.5 and an inherent viscosity of about 0.55. The cement is made by dissolving 10 grams of the adhesive copolymer in 100 cc. of toluene and then adding 4.0 grams of SAF black, 0.5 gram of zinc oxide, 0.15 gram of tellurium diethyl dithiocarbamate, 0.075 gram of tetramethyl thiuram disulfide and 0.10 gram of sulfur. The cement is applied by a brush and air dried. The final fabric contains about 15 percent of the cement based on the weight of the resin-coated fabric.

The coated fabric is vulcanized under approximately 240 p.s.i. pressure for 30 minutes at 160° C. with a 3 x 6" piece of the elastomer described in C above; it is found that a force of about 39 lbs./linear inch is required to separate the fabric from the elastomer stock when tested on an Instron Tensile Tester at 25° C. using a head speed of 2 inches/minute.

If the above example is repeated but the coating of adhesive, halogen-containing copolymer is omitted, only 5 lbs./linear inch is required to separate the fabric from the elastomer.

EXAMPLE 2

Example 1 is repeated except that the substrate material used is a 3 x 6" piece of a filament rayon fabric having a flat 2 x 1 weave with a count of 84 x 38 which is available as Style S-76 from Wellington Sears. The fabric after dipping in phenol-aldehyde resin and drying gains from about 4 to 9% of resin. After the second coating with adhesive copolymer and adhesion to elastomer stock the composite article prepared exhibits a strip adhesion of about 38 lbs./linear inch.

If, however, the adhesive copolymer coating is omitted, the strip adhesion is only above 18 lbs./linear inch.

EXAMPLE 3

Example 1 is repeated except that the phenol-aldehyde type resin of that example is replaced with one prepared as follows: About 5 cc. of 37 percent aqueous formaldehyde solution and 5.0 cc. of 10% aqueous NaOH solution were added, in turn, to a solution of 10.0 grams of resorcinol in 100 cc. of distilled water in a 250-cc. Erlenmeyer flask at 25-30° C. The resin solution is then stoppered and allowed to stand for about 44 hours before use. The resulting resin solution contains about 10.4% solids, has a pH of about 8.6 and the formaldehyde-resorcinol mole ratio is about 0.72 to 1.

In addition the resin-coated fabric is coated with about 19% of the copolymer adhesive. The strip adhesion obtained is about 45 lbs./linear inch.

If, however, the coating of copolymer adhesive is omitted the strip adhesion is only about 4 lbs./linear inch.

EXAMPLE 4

This example illustrates the bonding of the elastomer of Example 1 to the nylon fabric of Example 1 and the rayon fabric of Example 2, respectively.

The adhesive copolymer coating is prepared by dissolving an ethylene/5,6-dibromo-1-hexene/1,4-hexadiene copolymer (similar to that used in Example 1) in carbon tetrachloride so as to give a concentration of 2.5 grams per 50 cc. The adhesive copolymer denoted as compounded is made by dissolving 10 grams of a similar ethylene/5,6-dibromo-1-hexene/1,4-hexadiene terpolymer in 80 grams of toluene, adding 3.0 grams of HAF black, 0.5 gram of zinc oxide, 0.050 gram of 2-mercaptobenzothiazole, 0.15 gram of tetramethyl thiuram monosulfide, and 0.20 gram of sulfur.

The phenol-aldehyde type resin is used as a resin-latex mixture prepared at 25-30° C. by dissolving 27.5 grams of resorcinol in 55.0 cc. of distilled water in a 125-cc. Erlenmeyer flask. Then 14.0 cc. of a 37 percent aqueous formaldehyde solution are added slowly with stirring and mixed for 2 minutes. The resulting resin composition is then stoppered and stored for 1 hour at 25-30° C. After this period, its pH is adjusted to 7.0 by addition of a 7.85 weight percent aqueous NaOH solution. A 91.0-cc. portion of a butadiene/styrene/2-vinylpyridine resin latex ("Gen-Tac") is measured into a 16 oz. jar, and the above resin mixture is added slowly while stirring is maintained. On completion of the addition, the mixture is stirred for three more minutes and stored for 4 days before use. It has a useful life of about 30 days from the end of the initial storage period and the pH during this useful life is in the range of 7.4 to 7.9.

3 x 6" pieces of nylon and rayon are coated in accordance with the table below and vulcanized at 160° C. for 30 minutes under 240 p.s.i. pressure, tests C, D, G and H being outside the scope of the invention.

TABLE I

| Test | Fabric | Percent Resin | Percent Copolymer | Strip Adhesion (lbs./inch) |
|---|---|---|---|---|
| A | Nylon | 4.6 | 9.3 (raw) | 35 |
| B | do | 5.0 | 9.7 (compounded) | 53+ |
| C | do | None | 15 (compounded) | 5 |
| D | do | 5.0 | None | 7 |
| E | Rayon | 4.4 | 12 (raw) | 41+ |
| F | do | 4.1 | 15 (compounded) | 42+ |
| G | do | None | 17 (compounded) | 17 |
| H | do | 3.6 | None | 27 |

These results illustrate that the use of both coatings yields composite articles of superior adhesive strength. If, however, Test A is substantially repeated except that the nylon fabric is first coated with about 17% of the adhesive copolymer and, second, with about 52% of the resin-latex coating, a vulcanized article exhibits a strip adhesion of only about 4 lbs./linear inch. This illustrates that applying the coatings improperly in reverse order will not yield articles of superior bond strength.

EXAMPLE 5

The substrate material selected is a 3 x 6" piece of "Dacron" polyester fiber filament fabric having a 2-ply warp, 3-ply filling with a count of 60 x 48 obtainable from Alexander Lamport & Bros., 18-20 Thomas Street, New York, N.Y., as Style 39790-D-D. The phenol-aldehyde resin latex mixture is that described in Example 4 and the adhesive copolymer composition is the one used in Example 1.

The fabric is coated with about 7.7% of the phenol-aldehyde resin/latex mixture and dried for about 20 minutes at 135° C. The resin coated fabric is then coated with 10.0 weight percent of the halogenated copolymer adhesive compound and then cured under pressure for 30 minutes at 160° C. in contact with a 3 x 6" piece of elastomer stock of Example 1. The strength of the resulting bond at 25° C. was 15 lbs. per linear inch compared with 5 lbs. per linear inch for a similar piece of fabric which was coated only with 7.7 percent of resin/latex mixture.

EXAMPLE 6

Two 3 x 6" pieces of scoured 10 oz. cotton duck (made from 3 x 3 ply yarns with 56 warp and 28 fill threads obtainable from the Webb Manufacturing Co., 4th and Cambria Streets, Philadelphia, Pa.) are coated with 10 percent of the phenol-aldehyde type resin of Example 1.

One piece is coated with 11% of an adhesive composition made by dissolving 5 grams of an ethylene/5,6-dibromo-1-hexene/1,4-hexadiene copolymer (having a bromine content of 36% by weight, an iodine No. of 11, and an inherent viscosity of 0.53) in 60 cc. of hot $CCl_4$ and then adding the same relative amounts of compounding ingredients used in Example 1. The coated fabrics are cured under pressure for 30 minutes at 160° C. against the elastomer stock described in Example 1. The fabric coated only with the resin could be separated from the elastomer by exerting a force of 23 lbs. per linear inch; however, the fabric coated with the resin and the halogenated adhesive composition required 46 lbs. per linear inch.

EXAMPLE 7

A resin/latex mixture was made by adding to the resorcinol/formaldehyde resin employed in Example 1, 32 cc. of "Gen-Tac" latex so as to give 3 parts of butadiene-styrene-2-vinyl pyridine solids for each part of resin solids. When 6.9 percent of the resin/latex solids was applied to a 3 x 6" piece of filament nylon fabric, followed by the application of 16% of the same halogenated adhesive copolymer composition used in Example 1, and the resultant fabric then cured under a pressure of 200–250 p.s.i. for 30 minutes at 160° C. against a 3 x 6" piece of elastomer stock A of Example 1; the resultant bond strength was 38 lbs. per linear inch.

EXAMPLE 8

In this example the elastomer stock used is the same as that in Example 1 except that 20 parts of naphthenic petroleum oil ("Necton 60") are incorporated into the blending ingredients.

Two 3 x 6" pieces of filament rayon fabric are coated with approximately 6 weight percent of the resin/latex mixture of Example 4. One piece is cured without further treatment under 240 p.s.i. pressure for 30 minutes at 160° C. against a 3 x 6" piece of the supported elastomer stock. The other piece is coated with 14 weight percent of an adhesive copolymer composition similar to that used in Example 1 and then cured under the same pressure for 30 minutes at 160° C. against the elastomer stock. The strip adhesion for the cured pad made with fabric coated only with the resin/latex mixture had a strip adhesion of only 23 lbs. per linear inch, whereas the cured pad made from fabric using the fabric coated with both the resin/latex mixture and the adhesive copolymer had a strip adhesion of 51 lbs. per linear inch.

EXAMPLE 9

The elastomer stock employed is the same as that described in Example 1 except that the 1.5 parts of tetramethyl thiuram monosulfide are replaced with an equal amount of zinc diethyldithiocarbamate.

An ethylene/5,6 - dibromohexene/1,4 - hexadiene terpolymer similar to that used in Example 1 is made into an adhesive composition by dissolving 3.0 grams of the terpolymer in 50 cc. of toluene and then adding the following ingredients: 0.15 gram of zinc oxide, 1.2 grams of SAF black, 0.015 gram of 2-mercaptobenzothiazole, 0.045 gram of zinc diethyldithiocarbamate and 0.06 gram of sulfur.

A 3 x 6" piece of filament nylon is then coated with 9.5 weight percent of the resin/latex mixture of Example 4. After subsequent application of 12 percent of the adhesive copolymer described above, the coated fabric is cured under pressure for 30 minutes at 160° C. against the elastomer stock. The strip adhesion obtained is about 45 lbs. per linear inch.

EXAMPLE 10

Three 3 x 6" pieces of filament nylon are coated with about 3.2% of resin/latex mixture of Example 4. One (10A) is then coated with 6.4% of an adhesive copolymer composition similar to that used in Example 1. The other (10B) is coated with 21% of the same copolymer composition. After these pieces have been cured under pressure for 30 minutes at 160° C. against 3 x 6" pieces of elastomer stock of Example 1, the values for strip adhesion to 10A and 10B are about 45 and 59 lbs. per linear inch, respectively.

EXAMPLE 11

Example 10 is repeated except that the amounts of resin/latex mixture and adhesive copolymer coated on the nylon fabric is 33% and 11%, respectively. The resulting bond exhibits a strip adhesion of 52 lbs./linear inch.

EXAMPLE 12

The adhesive copolymer is an ethylene/5,6-dibromohexene/1,4-hexadiene copolymer with a bromine content of 49%, an iodine No. of 12 grams per 100 grams and an inherent viscosity of 0.47 which is made into a coating composition by dissolving 5.0 grams in 100 cc. of toluene and then adding 0.25 gram of zinc oxide, 2.0 grams of SAF black, 0.05 gram of sulfur, 0.075 gram of tellurium diethyldithiocarbamate, and 0.038 gram of tetramethyl thiuram disulfide. A 3 x 6" piece of filament nylon is coated first with 8% of the resin/latex mixture of Example 4 and then, subsequently, with 9.5% of the copolymer adhesive. After the coated filament has been cured under pressure for 30 minutes at 160° C. against the elastomer stock of Example 1, the strip adhesion of the resulting bond is about 51 lbs. per linear inch.

EXAMPLE 13

For this example, four different phenol-aldehyde resin/latex mixtures are prepared as follows:

*Resin/latex mixture A.*—After 55.6 cc. of distilled water and 4.41 cc. of a 7.85 weight percent aqueous NaOH solution have been stirred together in a 125-cc. Erlenmeyer flask at 25–30° C., 2.76 grams of resorcinol are added and mixed until dissolved. Then 3.80 cc. of 37% aqueous formaldehyde solution are added slowly with stirring. The resulting resin mixture is then agitated for two minutes, stoppered, and stored at 25–30° C. for 6 hours before further use. A 62.2-cc. portion of butadiene/styrene/2-vinylpyridine ("Gen-Tac") latex is then measured into a 16-oz. jar. After 15.3 cc. of distilled water have been slowly introduced with stirring, the above-prepared resin mixture is added slowly with agitation. After being stirred for 3 minutes, the resulting mixture is capped and stored for at least 4 hours before use. During its useful life of 48 hours, measured from the end of the 4-hour storage period, its pH (at 25–30° C.) is in the range of from about 9.6 to 10.0.

*Resin/latex mixture B.*—This mixture is prepared using the same directions given for Type A except that only 0.88 cc. of the 7.85% aqueous NaOH solution is used. Type B is also stored for 4 hours before use, and is not employed after 48 hours. Its pH (at 25–30° C.) during this time is in the range of from about 8.6 to 9.0.

*Resin/latex mixture C.*—This mixture is prepared as disclosed in Example 4 above.

*Resin/latex mixture D.*—A solution is prepared at 25–30° C. by dissolving 10.0 grams of resorcinol in 100 cc. of distilled water in a 250-cc. flask. After 5.0 cc. of 37% aqueous formaldehyde solution and 5.0 cc. of 10% aqueous NaOH solution have been added, in turn, the resulting composition resin is then stoppered and allowed to stand for 2 hours. A 100-cc. portion of "Gen-Tac" latex and 100 cc. of distilled water are combined in a 16-oz. jar. The above-prepared resin composition is then added slowly with agitation. Afterward, the resulting mixture is stirred for 5 minutes and then allowed to stand for at least 2 hours before use. It has a useful life of 48 hours from the end of this time, and its pH is approximately 8.9.

Four pieces of 3 x 6" filament nylon are coated with the four different resin/latex mixtures above. They are then subsequently coated with an adhesive copolymer composition similar to that used in Example 4 and cured under pressure for 30 minutes at 160° C. against the elastomer stock of Example 1. As the results given in the table below indicate, somewhat better adhesion is obtained with the more neutral resin/latex C but excellent adhesion is obtained with dips of widely different compositions.

| Resin/Latex Type | Percent Resin/Latex | Percent Copolymer | Strip Adhesion (lbs./lin. in.) |
|---|---|---|---|
| A | 9.8 | 7.0 | 35 |
| B | 11.0 | 6.7 | 35 |
| C | 8.8 | 6.9 | 47 |
| D | 7.9 | 6.7 | 40 |

EXAMPLE 14

The effect of variations in the iodine number and the inherent viscosity of the ethylene/5,6-dibromohexene/1,4-hexadiene copolymer is shown in the table below. In these experiments, 3 x 6" pieces of filament nylon are coated first with 6% of the resin/latex mixture of Example 4 and then with an adhesive copolymer composition prepared from the various copolymers shown in the table. All of these compositions are made up by first dissolving 5 grams of the copolymer in 100 cc. of warm toluene and then adding the following: 0.25 gram zinc oxide, 2.0 grams SAF black, 0.05 gram sulfur, 0.075 gram tellurium diethyl dithiocarbamate, 0.038 gram tetramethyl thiuram disulfide. In each case the fabric is cured under pressure to the elastomer stock of Example 1 for 30 minutes at 160° C.

*Halogenated copolymer*

| Percent Br | Iodine Number | Inherent Viscosity | Wt. Percent | Strip Adhesion (lbs./lin. in.) |
|---|---|---|---|---|
| 45 | 1.2 | 0.53 | 11 | 20 |
| 45 | 4.7 | 0.30 | 10 | 29 |
| 39 | 8 | 0.53 | 10 | 56 |
| 41 | 9.6 | 0.18 | 9.9 | 10 |

EXAMPLE 15

The adhesive halogen-containing copolymer is a brominated ethylene/1,4-hexadiene copolymer prepared from a copolymer of ethylene and 1,4-hexadiene made in accordance with the general directions of U.S. Patent 2,933,480, having an iodine No. of 94. About 15 grams of this copolymer are dissolved in 350 cc. of warm carbon tetrachloride in a one-liter resin kettle fitted with a stirrer, thermometer, nitrogen sparge and addition funnel. The solution is cooled to 0° C., and a solution of 2.6 cc., (8 grams, 0.050 gram-mole) of bromine in 10 cc. of carbon tetrachloride is added dropwise over 23 minutes. During the entire addition, an ultra-violet sun lamp is placed 1 foot away to illuminate the carbon tetrachloride solution. The stirring and ultraviolet irradiation are continued for 10 minutes after the addition is completed; the temperature is allowed to rise to 5° C. The now colorless solution is poured into acetone to precipitate the polymer; the filtered coagulum is then washed in turn with ethanol and with acetone in an Osterizer blendor. After being dried at room temperature overnight, the brominated ethylene/hexadiene copolymer obtained weighs 18 grams. The following properties are representative: bromide=34.6; iodine No.=10 grams per 100 grams; inherent viscosity=0.54.

An adhesive composition is made of the brominated ethylene/1,4-hexadiene dipolymer described above by dissolving 5 grams in 45 grams of carbon tetrachloride. To this solution are added 0.25 gram of zinc oxide, 0.075 gram of tellurium diethyl dithiocarbamate, 0.038 gram of tetramethyl thiuram disulfide, 0.05 gram of sulfur, 2.0 grams of SAF carbon black, and 0.05 gram of N-phenyl-β-naphthylamine. The mixture is then ball milled for at least 24 hours until a smooth dispersion was obtained.

A 3 x 6" piece of filament nylon coated with 5.2% of the resin/latex mixture of Example 4 is then overcoated with 14% of the adhesive composition described above. The fabric is dried for 15 minutes at room temperature and 5 minutes at 100° C. in a vacuum oven immediately before use. When it is cured under pressure against the elastomer stock of Example 1 for 25 minutes at 160° C., an adhesive bond of 51 lbs. per linear inch is obtained.

EXAMPLE 16

The halogen-containing copolymer adhesive is chlorinated ethylene/1,4-hexadiene copolymer prepared as follows: Fifteen grams of an ethylene/1,4-hexadiene copolymer, made in accordance with the general directions of U.S. Patent 2,933,480 and having an inherent viscosity (0.1 gram copolymer in 100 cc. of tetrachloroethylene) of 0.55 and an iodine No. of 104 grams per 100 grams, are dissolved in 400 cc. of warm carbon tetrachloride. The solution is cooled to 0° C. and a mixture of nitrogen (0.31 liter/min.) and chlorine (0.041 liter/min.) is passed through the vigorously agitated solution while ultraviolet radiation was provided by a sun lamp placed one foot away. After 28 minutes, the chlorine is shut off; five minutes later, the ultraviolet lamp and the nitrogen inflow are shut off. The solution is poured into excess acetone, precipitating a semi-liquid polymer which is separated and washed with more acetone. The polymer, dried at 80° C. for 20 minutes under vacuum, weights about 9 grams and has a chlorine content of about 21% by weight and an iodine No. of about 13. The adhesive copolymer is then compounded as in Example 1.

An adhesive composition is prepared by dissolving 5 grams of the above-described chlorinated ethylene/1,4-hexadiene copolymer in 40 grams of toluene and then adding the same amounts of compounding ingredients used in Example 15. It is ball milled until a smooth dispersion is obtained.

A 3 x 6" piece of filament nylon is coated first with 5.1% of the resin/latex mixture of Example 4 and, after drying for 20 minutes at 135° C., is coated with 9.4% of the chlorinated ethylene/hexadiene copolymer composition described above. An adhesion pad is made by curing the coated fabric against a 3 x 6" piece of the elastomer stock of Example 1 for 25 minutes at 160° C. while under about 200 p.s.i. pressure. The strip adhesion attained is about 36 lbs. per linear inch.

EXAMPLE 17

A nylon tire cord (Du Pont Type 840/1/2T) is passed at a rate of 15 yards/minute through an appropriately diluted resin/latex mixture as described in Example 4. It is dried first for 1.6 minutes in a 149° C. oven and then for 0.4 minute in a 204° C. oven. A 14% stretch is applied in the latter. In this way, coated cords are prepared which contain 1.6% and 5.4%, respectively, of the resin/latex solid.

An adhesive copolymer composition is prepared by dissolving 6.0 grams of an ethylene/5,6-dibromo-1-hexene/1,4-hexadiene copolymer (which has a bromine content of 35%, an Iodine Number of 13, and an inherent viscosity of 0.61) in 70 cc. of warm carbon tetrachloride and then adding 2.4 grams of SAF black, 0.30 gram of zinc oxide, 0.09 gram of tellurium diethyl dithiocarbamate, 0.045 gram of tetramethyl thiuram disulfide and 0.06 gram of sulfur. The coated nylon cords are subsequently coated with various amounts of the copolymer composition by passing the cords through the composition at a rate of about 5 ft./min. and then drying them by passing them first through a 3-ft. long chimney with an air temperature of 50–60° C. and then through a 2-ft. chimney with an air temperature of 135° C.

The adhesion of the cords so treated to the elastomer stock of Example 1 after a 40 minute cure at 160° C. under 3500 p.s.i. pressure is then measured by use of the so-called "H-Pull" test which is described in the India Rubber World, volume 114, pp. 213–217 and 219 (1946). Representative results are as follows:

| Percent Resin/Latex | Percent Copolymer | "H-Pull" Adhesion (lbs. at 25° C.) |
|---|---|---|
| 5.4 | 10 | 24 |
| 5.4 | 18 | 26 |
| 1.6 | 4 | 21 |
| 1.6 | 24 | 26 |
| 5.4 | 0 | 12 |

Note that when the adhesive copolymer is omitted that the "H-Pull" adhesion is only half (or less) than that obtained when both coatings are used.

EXAMPLE 18

The elastomer stock employed is the same as that used in Example 1 except that the HAF carbon black is replaced with 72 parts of SRF black, the amount of 2-mercaptobenzothiazole is increased to 0.75 part, and 35 parts of naphthenic petroleum oil ("Necton 60") are used.

A nylon tire cord identical to that described in Example 17 is coated with 5.7% of resin/latex mixture Type A of Example 13. It is then coated with 18% of an adhesive halogenated-copolymer composition similar to that described in Example 17 above and cured in the elastomer stock for 30 minutes at 160° C. under 3500 p.s.i. pressure.

The "H-Pull"-adhesion of this article is about 25 lbs. at 25° C. and 10 lbs. at 140° C.

If, however, the adhesive copolymer coating is entirely omitted the "H-Pull" adhesion is only about 2 lbs. at both temperatures.

EXAMPLE 19

An ethylene/5-iodo-1-hexene/1,4-hexadiene terpolymer is prepared in a manner similar to that previously described for the ethylene/5,6 - dibromo - 1 - hexene/1,4-hexadiene terpolymer by copolymerizing ethylene, 5-iodo-1-hexene, and 1,4-hexadiene. This terpolymer contains 18% iodine by weight, has an iodine number of 36 g./100 g. and an inherent viscosity of 1.18.

Five grams of the above terpolymer are dispersed in 120 cc. of carbon tetrachloride by heating them together at reflux temperature. After cooling, 0.25 gram of zinc oxide, 2.0 grams of SAF black, 0.05 gram of sulfur, 0.075 gram of tellurium diethyl dithiocarbamate, and 0.038 gram of tetramethyl thiuram disulfide are added and the adhesive is then ball milled overnight.

The 3 x 6" pieces of filament nylon are coated with 8 weight percent of resin/latex mixture of Example 4 in the manner previously described. One piece (19A) is cured without further treatment against the elastomer stock of Example 1 for 30 minutes at 160° C. under 240 p.s.i. pressure. The other piece (19B) is coated with 9% of the adhesive described above. It is also cured against the elastomer stock of Example 1 using the same conditions as used above.

Fabric 19A can be separated from the elastomer by exerting a force of only 4 lbs./linear inch, whereas fabric 19B requires 45 lbs./linear inch to effect separation.

EXAMPLE 20

An ethylene/1,4-hexadiene copolymer having an inherent viscosity (0.1 gram copolymer per 100 cc. of tetrachloroethylene at 30° C.) of 0.91 and containing 43% by weight 1,4-hexadiene monomer units is prepared in tetrachloroethylene in the presence of a vanadium tris-(acetylacetonate)/diisobutyl aluminum chloride catalyst in accordance with the general procedures of U.S. Patent 2,933,480. One hundred parts by weight of this copolymer are compounded on a standard rubber mill with 50 parts of HAF carbon black, 5 parts of zinc oxide, 0.5 part of sulfur, and 1.75 parts of piperidinium pentamethylene dithiocarbamate. The finished stock is sheeted off the mill so as to give a 25-mil thickness.

Three 3 x 6" pieces of filament nylon are given an 8% by weight coating with the resin/latex mixture of Example 4 and dried. One piece (20A) is used without further treatment. The second piece (20B) is coated with an adhesive containing an ethylene/5,6-dibromo-1-hexene/1,4-hexadiene copolymer and the third piece (20C) is covered with an adhesive containing a brominated ethylene/1,4-hexadiene copolymer. The characteristics of these halogenated polymers are shown in the table below. Both adhesives are made by the recipe described in Example 1.

Adhered assemblies are made by curing these three pieces of coated fabric under pressure for 30 minutes at 160° C. against 3 x 6" pieces of the supported ethylene/1,4-hexadiene stock. As the strip adhesion data in the following table indicate, the fabrics which are coated with the halogenated polymer adhesive have superior adhesion compared with the fabric coated only with the resin/latex mixture of Example 4.

*Adhesive used*

| Stock | Copolymer Properties | | | Wt. Percent Adhesive on Fabric | Strip Adhesion, lbs./in. |
|---|---|---|---|---|---|
| | Percent Br | I No. | Inherent Viscosity | | |
| A | | | | | 13 |
| B | 36 | 11 | 0.53 | 13 | 22 |
| C | 32 | 14 | 1.03 | 7.3 | 18 |

EXAMPLE 21

A. *α-Olefin hydrocarbon elastomer*

An elastomer stock is prepared similar to that described in Example 1C except that the hydrocarbon elastomer stock employed is made up of 80 parts of an ethylene/propylene/dicyclopentadiene terpolymer having the following composition by weight: ethylene units, 52.3%; propylene unit, 42%; dicyclopentadiene units, 5.7% and 20 parts of a naphthenic petroleum oil. The inherent viscosity of the copolymer (measured on a solution containing 0.1 gram of copolymer in 100 cc. of tetrachloroethylene at 30° C.) is 1.79.

B. *Preparation of the adhered article*

A 3 x 6" piece of filament nylon fabric is given a 7% by weight coating with the resin/latex mixture described in Example 4 and, after drying, a 12 weight percent coating of an adhesive composition similar to that described in Example 1 except that the halogen-containing copolymer has a bromine content of 30% by weight and an iodine number of 12.

When the coated fabric is cured in contact with the above elastomer stock for 30 minutes at 160° C. under a pressure of 240 p.s.i., a force of 52 lbs./linear inch is required to separate the fabric from the α-olefin hydrocarbon copolymer.

EXAMPLE 22

A. *Preparation of the halogen-containing adhesive polymers*

(1) *α-Olefin hydrocarbon copolymer.*—An ethylene/propylene/dicyclopentadiene copolymer containing 46% by weight propylene and 18% by weight discyclopentadiene units and exhibiting an inherent viscosity of 2.45

(measured as in Example 21) is prepared at 25° C. in tetrachloroethylene according to the general procedures given in U.S. Patent 3,000,866. The catalyst employed is made from vanadium tetrachloride and diisobutyl aluminum chloride.

(2) *Bromination of the α-olefin hydrocarbon copolymer.*—7.5 grams of the copolymer prepared in Part 1 above are dissolved in 250 cc. of dry carbon tetrachloride by heating at reflux at atmospheric pressure. The reactor is covered with aluminum foil to exclude light, the solution is cooled to room temperature (25–30° C.), and 4.26 cc. of a carbon tetrachloride/bromine solution containing approximately 0.97 gram of bromine are added. After the mixture has been stirred for 3 hours, the brominated terpolymer is isolated by pouring the solution into a blendor containing 500 cc. of acetone. The coagulated polymer is washed twice with 200 cc. of ethanol and dried. The product has 9.9% bromine by weight and gives an iodine number of 17.

(B) *Preparation of the adhesive composition*

100 parts of the brominated copolymer prepared in Part A above are dissolved in 150 cc. of carbon tetrachloride and ball milled for 24 hours at 25–30° C. along with 5 parts of zinc oxide, 40 parts of super abrasion furnace black, 1.5 parts of tellurium diethyldithiocarbamate, 0.75 part of tetramethyl thiuram disulfide, 1 part of sulfur, and 1 part of β-phenyl naphthylamine.

(C) *Preparation of the adhered article*

A 19 weight percent coating of the adhesive composition prepared in Part B above is applied to a nylon tire cord (Du Pont Type 840/1/2T) previously coated (using the techniques of Example 17) with 7.1 weight percent of the resin-latex mixture of Example 4 above. H-pull specimens are made up by curing the dried cord in an elastomer stock similar to that described in Example 1 for 40 minutes at 160° C. under 3500 p.s.i. pressure. The H-pull adhesion of the cured article at 25° C. is 16 lbs.; a cured control, similar except that the cord has only a coating of the resin-latex mixture, gives a value of only 11 lbs.

EXAMPLE 23

(A) *α-Olefin hydrocarbon copolymer*

The α-olefin copolymer employed is an ethylene/propylene/5-methylene-2-norbornene copolymer having 41% by weight propylene units and 2.6% by weight 5-methylene-2-norbornene units, the rest being ethylene units; the copolymer exhibits a Mooney viscosity (ML-4/212° F.) of 99 and exhibits an inherent viscosity (0.1 gram/100 cc. of tetrachloroethylene at 30° C.) of 2.5.

The copolymer is compounded according to the following recipe:

| Component: | Parts by Weight |
|---|---|
| Ethylene copolymer | 100 |
| HAF carbon black | 50 |
| Zinc oxide | 5 |
| Naphthenic petroleum oil | 20 |
| Tetramethyl thiuram monosulfide | 1.5 |
| 2-mercaptobenzothiazole | 0.50 |
| Sulfur | 1.5 |

(B) *Preparation of the adhered article*

The compounded α-olefin copolymer stock is cured for 30 minutes at 160° C. under a pressure of 240 lbs./sq.in. against a filament nylon fabric which has been previously successively coated with (a) 7 weight percent of a resin/latex mixture similar to that used in Example 4 and (b) with 9.9 weight percent of a halogen-containing copolymer composition similar to that used in Example 1 except that the copolymer contains 35 percent by weight bromine, has an iodine number of 13, and exhibits an inherent viscosity (measured as in Example 1) of 0.61. A force of 39 lbs./linear inch is required to separate the fabric from the elastomer.

EXAMPLE 24

(A) *Preparation of bromine-containing polymeric adhesive*

(1) *Ethylene/1,4-hexadiene copolymer.*—The ethylene/1,4-hexadiene copolymer employed is made in tetrachloroethylene in the presence of a diisobutyl aluminum monochloride/vanadium tris(acetylacetonate) coordination catalyst in accordance with the general directions of U.S. Patent 2,933,480. This copolymer has 67 weight percent ethylene units and 33 weight percent 1,4-hexadiene units. Its inherent viscosity is 1.41 (measured at 30° C. on a solution containing 0.1 gram of the copolymer in 100 cc. of tetrachloroethylene).

(2) *Bromination of the ethylene/1,4-hexadiene copolymer.*—In the dark at 25–30° C. a solution of 0.05 gram of bromine in 0.43 milliliter of carbon tetrachloride is added to an agitated solution of 5 grams of the ethylene/1,4-hexadiene copolymer of Part 1 in 100 milliliters of carbon tetrachloride. Thirty minutes later the reaction mixture is poured into a pan. The brominated polymer obtained by overnight evaporation of the solvent at 25–30° C. is heated at 60° C. for 60 minutes in a vacuum oven. The dry copolymer product has 1.5% bromine by weight.

(B) *Preparation of the polymeric adhesive composition*

An adhesive is made by dissolving 4 grams of the halogenated copolymer of Part A in 40 grams of carbon tetrachloride at 25–30° C., adding 7.5 parts of ZnO, 2.25 parts of tellurium diethyldithiocarbamate, 1.125 parts of tetramethylthiuram disulfide, 1.5 parts of sulfur, 60 parts of super abrasion furnace black and 1.0 parts of phenyl-β-naphthylamine per 100 parts of halogenated copolymer and ball milling overnight at 25–30° C.

(C) *Preparation of the adhered article*

A filament nylon fabric, primed with 6.5 weight percent of the resin/latex mixture described in Example 4, is given a 12% coating of the adhesive composition of Part B. The coated fabric is then cured for 30 minutes at 160° C. at 240 p.s.i. while pressed against an ethylene/propylene/1,4-hexadiene copolymer stock similar to that described in Example 1 but additionally compounded with 20 parts of a naphthenic hydrocarbon oil. The strip adhesion strength of the resulting bond (measured at 25° C.) is typically 30 lbs./linear inch.

EXAMPLE 25

*Preparation of polyisocyanate/epoxy pretreating composition*

In accordance with U.S. Patent 3,234,067 a slurry is prepared in the following manner. Add 0.6 part of a paste containing 75% by weight of dioctyl sodium sulfosuccinate and 25% water (commercially available from American Cyanamid Company as "Aerosol OT") to 20.4 parts of water and mixed for 5 minutes. Then add 4.5 parts of the diphenyl ester of 4,4'-methylenedicarbanilic acid (commercially available from Du Pont as "Hylene MP" organic isocyanate) and mix for 10 minutes. To a 4.6-gallon ball mill which contains approximately 20 lbs. of grinding media, add 4.5 lbs. of the following epoxy resin ("Araldite 6084," an epoxy resin based on bisphenol A, manufactured by Ciba Company) having an epoxide equivalent of 935 and a melting point of 100° C. Then introduce 25.5 lbs. of the slurry prepared above and ball mill on a roller mixer for about 72 hours. The resulting slurry contains 31.5% solids.

A 6-lb. charge of the above slurry (containing 31.5% solids) is mixed at room temperature with 2.3 lbs. of water at 25° C. for about 2–3 minutes. Then add 0.75 lb. of a 2% dispersion of anionic charged guar gum colloid (commercially available from Stein, Hall and Company, Inc., New York as "Jaguar M–808." The viscosity in a 1% concentration is 30–40 centipoises, recorded on a Brookfield viscometer at 20 revolutions per minute at 25° C.). After mixing the colloid into the composition for 2–3 minutes, add 5.95 lbs. of resorcinol/formaldehyde/latex adhesive dip prepared as described in Example I of U.S. Patent 3,234,067 (contains "Gen-Tac" commercially available from General Tire and Rubber Company). Mix for an additional 5 minutes. The final mixture obtained has 27.3% solids.

Type 68, 840/2 "Dacron" polyester tire cord is coated with the polyisocyanate/epoxy adhesive composition prepared above, the pick-up after drying being about 8–9%.

*Preparation of adhesive composition from brominated ethylene/1,4-hexadiene copolymer*

An ethylene/1,4-hexadiene copolymer having about 29–31% hexadiene content is prepared as described in U.S. Patent 3,224,985. The copolymer is dissolved in $CCl_4$ and brominated by adding a dilute solution of $Br_2$ in $CCl_4$ until a brominated copolymer is produced having about 23.5% $Br_2$ content and an iodine No. of about 20.

A solution of 100 parts of the brominated ethylene/1,4-hexadiene copolymer in 2275 parts of methyl chloroform is compounded by ball milling at room temperature with the following materials:

| Component: | Parts |
|---|---|
| SAF carbon black | 60 |
| Zinc oxide | 7.5 |
| Tellurium diethyldithiocarbamate | 2.25 |
| Tetramethyl thiuram disulfide | 1.125 |
| Sulfur | 1.5 |
| N-phenyl-$\beta$-naphthylamine | 1.0 |

In this adhesive composition the solid content is about 7.1%; of the solids, 57.7% is the brominated ethylene/1,4-hexadiene copolymer.

*Application of the brominated/1,4-hexadiene copolymer adhesive composition to coated polyester tire cord*

The polyester tire cord which has been pretreated with the aqueous composition described above containing a mixture of polyisocyanate/epoxy resin/resorcinol-formaldehyde resin-latex is then coated with the brominated ethylene/1,4-hexadiene copolymer adhesive composition described above.

The pick-up after drying is about 13%, based on the weight of cord.

*Preparation of adhered assembly*

The α-olefin copolymer composition employed is described in Part C of Example 1 with the modification that 20 parts of naphthenic petroleum oil ("Necton 60") were also present.

The adhesion of the coated cords to the substrate after a 40-minute cure at 160° C. under 3500 lbs. per square inch pressure is then measured by the "H-pull" test.

| H-pull adhesion: | lbs. |
|---|---|
| Room temperature | 18 |
| 100° C. | 11 |

If, for comparison, the example is repeated except that the brominated ethylene/1,4-hexadiene copolymer coating is omitted, the values at room temperature and 100° C. typically drop to about 10 and 8, respectively.

EXAMPLE 26

*Preparation of ethylene/5,6-dibromo-1-hexene/1,4-hexadiene copolymer*

An ethylene/1,4-hexadiene/5,6-dibromo-1-hexene copolymer is prepared in methylene chloride at about −10° C. using a diisobutylaluminum chloride-vanadium oxybis(acetylacetonate) coordination catalyst. The polymer has a bromine content of about 31%, an iodine No. of 13 and an inherent viscosity of 0.69 (0.1 g. copolymer in 100 ml. tetrachloroethylene at 30° C.).

*Preparation and testing of adhered article*

An adhesive composition is prepared by substituting the terpolymer of this example for the brominated copolymer of Example 25. Polyester tire cord, coated with the aqueous polyisocyanate/epoxy resin/resorcinol-formaldehyde resin composition of Example 25 to the same degree of pick-up, is coated with the ethylene/5,6-dibromo-1-hexene/1,4-hexadiene copolymer adhesive composition to a pick-up of about 6.8%. The coated cord is cured for 40 minutes at 160° C. against the elastomeric copolymer of Part C of Example 1.

To measure adhesion by the "pop" test, two cylinders of elastomer, 0.7-in. diameter and 0.5-in. tall are selected and the cord is cured between them, along a diameter. The composite cured structure being a 1-in. tall cylinder with the cord passing through transverse to the axis, is heated for 1 hr. at 100° C., then compressed axially at the rate of 1 in./min. The adhesion between the cord and the elastomer resists the tendency of the middle of the cylinder to bulge; when the bond fails, the chart measuring the increasing compressive force records the failure. This test indicates a force of about 350 lbs. for this example. If, for comparison, a control run is made on a cord having the second coating omitted, the failure may take place at a force of only about 150 lbs.

EXAMPLE 27

*Preparation of adhesive composition*

Adhesive compositions are prepared by substituting the following copolymers for the brominated ethylene/1,4-hexadiene copolymer in the adhesive composition of Example 25 given above:

(A) Brominated ethylene/propylene/dicyclopentadiene copolymer having 26% bromine, an iodine number of 47, and an inherent viscosity of 0.95.

(B) Brominated ethylene/propylene/dicyclopentadiene copolymer having 8.6% bromine, an iodine number of 34.

(C) Brominated ethylene/dicyclopentadiene dipolymer containing 17% bromine, 1.19 gram-mole of carbon-to-carbon double bonds per kilogram, and an inherent viscosity of 0.52.

(D) Ethylene/5,6-dibromohexene/1,4-hexadiene copolymer having 49% bromine, an iodine number of 12, and an inherent viscosity of 0.47.

(E) Brominated ethylene/1,4-hexadiene copolymer having 5.5% bromine, an iodine number of about 63, and an inherent viscosity of 1.2.

*Preparation of adhered articles*

The polyester tire cord containing 8–9% aqueous prime coat as described in Example 25 is employed. The prime coated polyester tire cord is coated with the adhesive compositions prepared above; the percent pick-up for each type is given in the table below. Adhered articles for H-pull adhesion tests are prepared by curing the treated cords against the elastomer substrate composition of the Example 25 (containing naphthenic petroleum oil as before). For some of the tests, a carcass stock was substituted having the following composition.

| Component: | Parts |
|---|---|
| Ethylene/propylene/1,4-hexadiene copolymer (Example 1) | 100 |
| HAF carbon black | 80 |
| Naphthenic petroleum oil | 47.5 |
| Zinc oxide | 5 |
| Tetramethyl thiuram monosulfide | 1.5 |
| 2-mercaptobenzothiazole | 0.75 |
| Stearic acid | 1.0 |
| Sulfur | 1.0 |

All these stocks are cured for 40 minutes at 160° C. under pressure as described in Example 25. For purpose of comparison, polyester tire cords containing only the prime coat were cured against these substrates. The table which follows gives the results obtained:

| Over-dip | Percent pick-up | Substrate | H-pull adhesion at 25° C. (lbs.) |
|---|---|---|---|
| None | 0 | Carcass | 8 |
| Brominated E/P/DCPD | 6.7 | ....do.... | 12 |
| None | 0 | Example 25 | 10 |
| Brominated E/P/DCPD (8.6% bromine) | 8.2 | ....do.... | 16 |
| Brominated E/DCPD | 5 | ....do.... | 13 |
| E/DBH/HD | 8 | ....do.... | 17 |
| Brominated E/HD | 14 | ....do.... | 17 |

EXAMPLE 28

*Preparation of pretreating composition*

A slurry is prepared in the following manner. Add 0.24 lbs. of a paste containing 75% by weight of dioctyl sodium sulfosuccinate and 25% water to 6.26 lbs. of warm water and mix at slow speed until completely dissolved (approximately 5 minutes are required). Add the solution obtained to 16 lbs. of water at room temperature while mixing at slow speed. To the resulting solution add 7.5 lbs. of the diphenyl ester of 4,4′-methylene-dicarbanilic acid ("Hylene MP" organic isocyanate) and mix at slow speed until completely dispersed. The resulting composition is added to a 4.6-gallon ball mill containing approximately 20 lbs. of grinding media. Ball mill the composition on a roller mixer for 72 hours. The resulting composition is ball milled or mixed 1 hour before using in order to assure complete suspension; high speed mixing is avoided to prevent foaming. The slurry of blocked polyisocyanate contains 25% solids.

Add 0.14 lb. of epoxy resin ("Epon 812") to 8.37 lbs. of water at room temperature and mix slowly. Prepare a solution containing 2% solids by adding 5 grams of gum tragacanth to 245 grams of water at room temperature; mix until completely dissolved (approximately 5 minutes required). Add 0.2 lb. of the resulting 2% gum solution (freshly mixed) to the epoxy resin-water solution while mixing slowly. Finally add 1.29 lbs. of the blocked isocyanate slurry to the resulting mixture and mix for 3 minutes at slow speed.

The overall composition contains 5.0% solids and is made in the following proportions: 8.37 parts of water (room temperature); 0.14 part of epoxy resin; 0.2 part of the 2% solution of gum tragacanth; and 1.29 parts of a 25% slurry of blocked organic isocyanate. The solids will settle out very quickly when not agitated or circulated. When in use, the dip must be circulated using the pump provided or agitated manually every 5 to 10 minutes. For best results this dip should be made fresh each day it is to be used.

*Preparation of resorcinol-formaldehyde latex dip*

A resorcinol/formaldehyde (RFL) dipping composition is prepared in the following way. 1.38 lbs. of resorcinol, 2.39 lbs. of 1.57% aqueous sodium hydroxide, 2.02 lbs. of 37% aqueous formaldehyde, and 27.8 lbs. of water (at 75–78° F.) are stirred together and allowed to age for 6 hours. Then the resulting composition is mixed with 30.50 lbs. of 41% "Gen-Tac" (a terpolymer of butadiene/styrene/2-vinyl pyridine), 7.64 lbs. of water at 75° F., and 1.42 lbs. of 28% aqueous ammonium hydroxide. The final composition is allowed to age at least 12 hours before use.

*Application to polyester tire cord*

Type 68, 840/2 "Dacron" polyester tire cord is coated with 0.44% pick-up of the pretreating composition described above, dried and coated with 4.2% pick-up of the resorcinol/formaldehyde composition.

The doubly coated polyester tire cord is given a coating made from the brominated ethylene/1,4-hexadiene copolymer adhesive described in Example 25. The pick-up after drying is about 10% based on the weight of the cord. Drying is done by exposing the cord in air at 135° C. for 0.7 minute.

*Preparation of adhered assembly*

The carcass stock described above in Example 27 is cured against the coated cords for 40 minutes at 160° C. The following results are typical:

H-pull adhesion: Lbs.
  Room temperature _____ 17
  100° C. _____ 8

If, for comparison, the brominated coating is omitted, the values typically drop to 7 lbs. and 6 lbs. respectively. If only the pretreating coating is applied, or if the latter is applied with the brominated coating directly thereover (omitting the RFL dip), the values typically drop to 4 lbs. and 3 lbs., respectively.

EXAMPLE 29

*Preparation of pyrrolidone-containing pretreating composition*

Dissolve 20 parts by weight of the diphenyl ester of 4,4′-methylene-dicarbanilic acid ("Hylene MP" organic isocyanate) with stirring in 100 parts of 2-pyrrolidone. Then add, again with stirring, 20 parts of the epoxy resin ("Epon 812") and 3 parts of 10% by weight aqueous sodium hydroxide. The ratio of pyrrolidone to "Epon 812" to "Hylene MP" is 5:1:1. Use the fresh composition thus made.

*Preparation of adhered assembly*

A polyester tire cord is coated with the above composition and dried. Next a coating of a resorcinol/formaldehyde (RFL) composition (20 weight percent) is applied and dried. Lastly, a coating of the brominated copolymer of Example 25 is applied (13% pick-up) and dried at 135° C. in an air oven for about 0.7 minutes. The coated polyester tire cord is pressed against the carcass stock described in Example 27 and cured at 160° C. for 40 minutes under pressure. The following results were obtained:

H.-pull adhesion: Lbs.
  Room temperature _____ 16
  100° C. _____ 10

If, for comparison, the brominated coating is omitted, the values typically drop to about 8 lbs. and 6 lbs., respectively. If both the RFL and the brominated coatings are omitted, the values typically drop to about 4 lbs. and 3 lbs., respectively; if only the RFL coating is omitted, the results are only slightly better.

The iodine number, as used herein, is determined by Wijs method at 25° C. A modified Wijs reagent is prepared by adding 2.5 ml. of iodine monochloride and 2 small iodine crystals to 500 ml. of chloroform (or carbon tetrachloride). A 25-ml. sample of this reagent is added to a flask containing 25 ml. of a solution of polymer in chloroform (or carbon tetrachloride). The resulting mixture is allowed to stand in the dark for 120 minutes. The flask is then removed, 2 grams of potassium iodide are added, and the resulting mixture is titrated with 0.1 N sodium thiosulfate. After a color change from purple-black to light brown (or yellow) occurs, 2 ml. of starch solution are added; titration is continued until the mixture is clear. A blank is determined by following the above procedure without a polymer sample. The iodine number, defined as the grams of iodine consumed by 100 grams of polymer, is calculated as $$\frac{\text{milliters of thiosulfate (blank-sample)} \times 0.1 \times 12.69}{\text{grams of polymer}}$$

The adhesive strength of the bond between the coated substrate and the α-olefin copolymer depends critically upon the iodine number of the halogen-containing adhesive polymer layer. The iodine number is related to the sulfur curability of the adhesive polymer. When nylon is bonded to a sulfur-curable ethylene/propylene/1,4-hexadiene copolymer using adhesive polymers of varying iodine numbers, the critical dependence shown in the following table is observed; it will be noted that the inherent viscosity, an important variable, is relatively constant throughout this comparison.

| Adhesive Iodine Number | Adhesive Inherent Viscosity | Adhesive Strength [1] (lbs./inch) |
|---|---|---|
| 1.2 | 0.53 | 20 |
| 3.8 | 0.44 | 40 |
| 8 | 0.52 | 56 |
| 13 | 0.61 | 58 |

[1] Between the nylon and the hydrocarbon copolymer.

Thus, when the iodine number is approximately 1, there is poor adhesion even when the halogen-containing adhesive polymer has the proper inherent viscosity and halogen content. If the inherent viscosity is above about 0.5, the adhesive strength of the bond is relatively constant when the iodine number is in the range of about 4 to 14. Good adhesives have been obtained with iodine numbers as high as 72. Frequently iodine numbers between about 8 and 14 are preferred.

The inherent viscosity of the halogen-containing adhesive polymer is another critical feature as is shown in the following table which gives the variations in adhesive strength of the composite articles when nylon is bonded to an ethylene/propylene/1,4-hexadiene elastomer with halogen-containing polymers of different inherent viscosities; it will be noted that in the comparison the iodine number value of the adhesive polymers is relatively constant.

| Adhesive Inherent Viscosity | Adhesive Iodine Number | Adhesive Strength [1] (lbs./inch) |
|---|---|---|
| 0.55 | 10 | 48 |
| 0.28 | 13 | 22 |
| 0.18 | 10 | 10 |

[1] Between nylon material and the elastomer.

Thus, it can be seen that even when the halogen-containing adhesive polymer has a high iodine number, such as 10 and 13, the bond strength is reduced when the inherent viscosity of the polymer is 0.28 or below. It is preferred that the inherent viscosity be above 0.5.

In order that a strong bond be formed between the halogen-containing adhesive polymer layer and the phenol-aldehyde type resin layer, it is necessary that the adhesive have at least about 1% halogen by weight. The amount of halogen needed for optimum results will depend upon the particular adhesive being applied and the α-olefin copolymer and the particular polyester, polyamide, or cellulosic substrate. Those skilled in the art can readily determine by routine experimentation the halogen content necessary in the adhesive polymer to obtain the best results for the particular system being studied. For adhesion to fabric the halogen content can be very small. Thus increasing the bromine content from 0 to 1.5% by weight of the adhesive in one typical instance raised the bonded strength to the fabric from 10 to 30 lbs., respectively. The following table shows that approximately constant adhesion is obtained when bonding a nylon fabric to an ethylene/propylene/1,4-hexadiene elastomer using adhesive copolymer having the same degree of unsaturation and approximately the same inherent viscosity but differing markedly in the bromine content.

| Percent Bromine in Adhesive | Adhesive Iodine Number | Adhesive Strength [1] (lbs./inch) |
|---|---|---|
| 14 | 12 | 42 |
| 30 | 12 | 53 |
| 39 | 12 | 48 |

[1] Between nylon and the elastomer.

For adhesion to cord, it may be necessary to use a halogen-containing adhesive polymer having a higher minimum amount of bromine, for example about 20–25% by weight. In general the halogen content can vary from at least 1% to 50% by weight of the halogen-containing adhesive polymer.

As mentioned above, the α-olefin hydrocarbon copolymers are made by copolymerizing at least one α-monoolefin (preferably ethylene) and at least one nonconjugated hydrocarbon diene. It is preferred that these copolymers be elastic but any copolymer which in the uncured state is plastic, that is—will flow under pressure, is suitable. The straight-chain α-monoolefins are preferred for making the copolymers. Representative examples include ethylene, propylene, 1-butene, 1-hexene, and 1-octadecene. Other α-monoolefins such as 4-methyl-1-hexene can be employed. Suitable nonconjugated dienes include: open-chain $C_6$–$C_{22}$ dienes having the structure

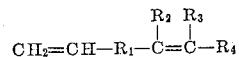

wherein $R_1$ is an alkylene radical, $R_2$, $R_3$ and $R_4$ are independently selected from the group consisting of hydrogen and alkyl radicals; a 5-alkenyl-substituted-2-norbornene; 5-methylene-2-norbornene; dicyclopentadiene; and a 2-alkyl-2,5-norbornadiene.

Suitable sulfur curable α-olefin hydrocarbon copolymers can be prepared by methods known in the art and disclosed, for example, in U.S. Patents 2,933,480; 3,000,866; 3,063,973; 3,093,620; and 3,093,621; British Patent 957,105; French Patent 1,371,435 and many other U.S. and foreign patents disclosing the polymerization of α-olefins.

The halogen-containing adhesive polymer can be made by a variety of methods. A highly useful class is prepared by copolymerizing ethylene with at least one halogen-substituted α-olefin and at least one nonconjugated hydrocarbon diene. Preferably the halogenated olefin has the formula $CH_2=CH-CH_2-R'$ wherein $R'$ is an alkyl radical of from 1 to 3 carbon atoms substituted by one or more halogen atoms. The halogen atom should be no closer to the α-double bond than on the fourth carbon atom as in 4-chloro-1-butene. The preferred olefins include: 4,5-dibromo-1-hexene and 5,6-dibromo-1-hexene. Halogen bearing 2-norbornenes may be employed such as 5-bromo-2-norbornene.

The halogen-substituted ethylene copolymers may be typically prepared by contacting the monomers in an inert solvent system, e.g., methylene chloride, at temperatures from about −10° C. to +25° C. in the presence of a coordination catalyst system, e.g., vanadium oxybis(acetylacetonate) with diisobutyl aluminum chloride with a molar ratio of aluminum to vanadium of about 9:1. The concentration of vanadium salt in the copolymerization reaction zone is about 0.00005 to 0.005 mole/liter.

The halogen-containing adhesive polymers, wherein the side-chain halogen is chlorine, bromine or iodine, can be made also by adding the appropriate halogen or hydrogen halide to part of the side-chain carbon-carbon double bonds of an α-olefin/nonconjugated hydrocarbon diene copolymer such as those described above. The halogenation and hydrohalogenation procedures familiar to those skilled in the olefin art can be used. Representative procedures which are applicable here are given in Synthetic Organic Chemistry, R. B. Wagner and H. D. Zook, John Wiley & Sons, Inc., New York, 1953, pp. 106–108. It is not always necessary to isolate the hydrocarbon copolymer before adding the halogen. For example, after a copolymer has been made in solution and the catalyst deactivated with alcohol, one can add bromine at 0° C. in an amount sufficient to leave about 2 to 5% diene units unreacted and thereafter isolate the copolymer by conventional means.

The preferred copolymers for halogenation are made by copolymerizing ethylene with at least one of the above-described open-chain nonconjugated dienes having the structure

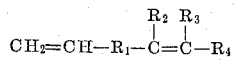

and optionally, with at least one of the above-described α-monoolefins having the structure $CH_2=CH-R$. These hydrocarbon copolymers have at least 3 gram-moles of side-chain carbon-carbon double bonds per kilogram and display an inherent viscosity (0.1 gram of copolymer per 100 cc. of tetrachloroethylene at 30° C.) of at least about 0.30.

These copolymers having a high diene content can be made in accordance with the general directions given in U.S. Patent 2,933,480. The preferred catalyst, however, is prepared by mixing about 1 molar proportion of vanadium tris-(acetylacetonate) with 7.5 molar proportions of diisobutyl aluminum monochloride. The preferred solvents are tetrachloroethylene and carbon tetrachloride. The preferred polymerization temperature ranges between about 0 and −10° C.

The preferred halogenated copolymer consists of 48% by weight ethylene monomer units, 48% by weight of 5,6-dibromo-1-hexene monomer units, and 4% by weight 1,4-hexadiene monomer units. It preferably has an iodine No. of 12 and an inherent viscosity of about 0.7. Another preferred composition which contains 35% by weight bromine, has an iodine No. of 10, is made by brominating an ethylene/1,4-hexadiene copolymer which has originally an inherent viscosity (0.1 gram/100 cc. of tetrachloroethylene at 30° C.) of about 1.0 and an iodine No. of about 90. It should be noted that this polymer after bromination contains monomer units of ethylene, 1,4-hexadiene and 4,5-dibromo-1-hexene just as though the latter had been employed as a comonomer. Still another alternative is a chlorinated ethylene/1,4-hexadiene copolymer having an iodine No. of 10, and containing 21% chlorine.

The strengths of the adhesive bonds formed in composite articles prepared according to this invention are close to the mechanical limits of the elastomer and/or the cord. The improvements shown represent a major improvement in adhesion and can mean the difference between acceptable and unacceptable performance in use.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A process for adhering a substrate selected from the group consisting of polyamide, polyester or cellulosic substrates to a sulfur-curable elastomeric chain-saturated α-olefin hydrocarbon copolymer of at least one α-monoolefin of the structure $R-CH=CH_2$ wherein R is selected from the group consisting of hydrogen and alkyl of from 1 to 16 carbon atoms, and at least one nonconjugated hydrocarbon diene, which process comprises: (I) coating said substrate with a heat-hardening phenol-aldehyde type resin; (II) drying the coating material applied in step (I); (III) coating the resulting coated substrate with a sulfur-curable copolymer containing units of ethylene and a halogenated compound of the formula $CH_2=CH-CH_2-R'$ wherein R' is an alkyl radical having from about 1 to 3 carbon atoms and being substituted by at least one halogen of the group consisting of chlorine, bromine and iodine and wherein the said halogen content of the halogen-containing copolymer is at least about 10 weight percent and wherein said halogen-containing copolymer exhibits an inherent viscosity of at least about 0.3; (IV) drying the coating applied in step (III); and (V) curing said hydrocarbon copolymer while pressing the latter in contact with said coated substrate material, thereby firmly adhering the latter to said hydrocarbon copolymer.

2. A process as defined in claim 1 wherein said nonconjugated hydrocarbon diene is selected from the group consisting of 1,4-hexadiene, dicyclopentadiene, and 5-methylene-2-norbornene; and said halogenated compound is selected from the group consisting of 4,5-dibromo-1-hexene and 5,6-dibromo-1-hexene.

3. A process for adhering a substrate selected from the group consisting of polyamide, polyethylene terephthalate and cellulosic fibrous materials, to a sulfur-curable elastomeric chain-saturated α-olefin hydrocarbon copolymer selected from the group consisting of copolymer of (a) ethylene/propylene/1,4-hexadiene, (b) ethylene/propylene/dicyclopentadiene, (c) ethylene/propylene/5-methylene-2-norbornene, and (d) ethylene/1,4-hexadiene, which process comprises (I) coating said substrate with a heat-hardening phenol-aldehyde type resin; (II) drying the coating material applied in step (I); (III) coating the resulting coated substrate with a sulfur-curable copolymer selected from the group consisting of copolymers of ethylene/5,6-dibromo-1-hexene/1,4-hexadiene, and brominated ethylene/1,4-hexadiene copolymers, said selected copolymer having an inherent viscosity of at least about 0.3 and a bromine content of at least about 10 weight percent; (IV) drying the coating applied in step (III); and (V) curing said α-olefin hydrocarbon copolymer while pressing the latter in contact with said coated substrate, thereby firmly adhering the latter to the α-olefin copolymer.

4. A process as defined in claim 3 wherein said phenol-aldehyde type resin has admixed therewith a butadiene/styrene/2-vinylpyridine latex, the latex to resin ratio (dry weight basis) ranging from 0.5:1 to 6:1.

5. A process as defined in claim 3 wherein said substrate is polyethylene terephthalate polyester having first been pretreated with a mixture of (a) a polyepoxide and (b) an aromatic polyisocyanate.

6. A process as defined in claim 3 wherein said substrate is polyethylene terephthalate polyester and said phenol-aldehyde type resin coated in step (I) is one component of a mixture of (a) a polyepoxide, (b) an aromatic urethane, and (c) a vinyl pyridine copolymer latex.

7. A process as defined in claim 3 wherein said substrate is polyethylene terephthalate polyester having first been pretreated with a mixture of (a) 2-pyrrolidone, (b) polyepoxide, (c) an alkaline catalyst, and (d) formaldehyde or a blocked polyisocyanate.

8. The product produced by the process of claim 3.

References Cited

UNITED STATES PATENTS

| | | | |
|---|---|---|---|
| 2,652,353 | 9/1953 | Wilson | 156—110 |
| 2,822,311 | 2/1958 | Rowe et al. | 156—110 |
| 3,013,599 | 12/1961 | Riggs | 156—362 |
| 3,036,948 | 5/1962 | Danielson | 156—330 |
| 3,039,906 | 6/1962 | Baldwin et al. | 156—110 |
| 3,058,859 | 10/1962 | Amberg | 161—243 |
| 3,222,330 | 12/1965 | Nyce et al. | 156—110 |
| 3,228,793 | 1/1966 | Stemmer et al. | 117—161 |
| 3,241,592 | 3/1966 | Sneary | 161—252 X |

EARL M. BERGERT, *Primary Examiner.*

CLIFTON B. COSBY, *Examiner.*